Dec. 24, 1957   R. S. DEAN   2,817,243
POWER TRANSMISSION
Filed Aug. 31, 1956

Reginald S. Dean
INVENTOR

2,817,243
POWER TRANSMISSION

Reginald S. Dean, Hyattsville, Md., assignor to Chicago Development Corporation, Riverdale, Md.

Application August 31, 1956, Serial No. 607,453

1 Claim. (Cl. 74—214)

This invention relates to power transmission by friction drives. It relates particularly to friction drives in which at least one member consists of an alloy of manganese and copper having a low shear modulus in relation to its elastic limit. It has for its aim the provision of friction drives with high efficiency and minimum wear.

I am familiar with the usual difficulties met in making friction drives suitable for transmission of more than very small amounts of power.

Figure 1:
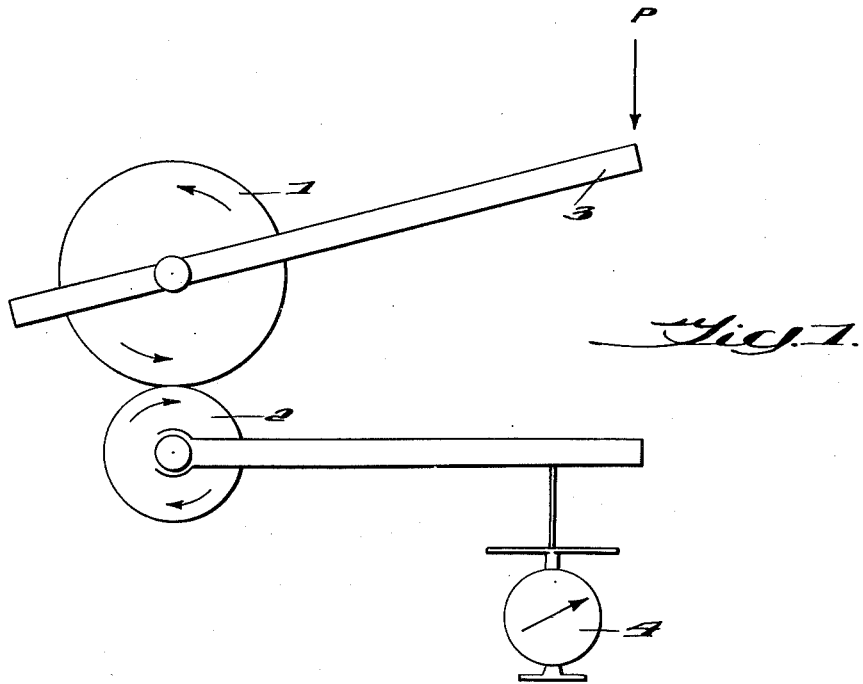

To understand this situation, and the solution of the problem according to my invention it is necessary to consider the following analysis of a friction drive:

Figure 1 illustrates a simple friction drive.

Figure 2:
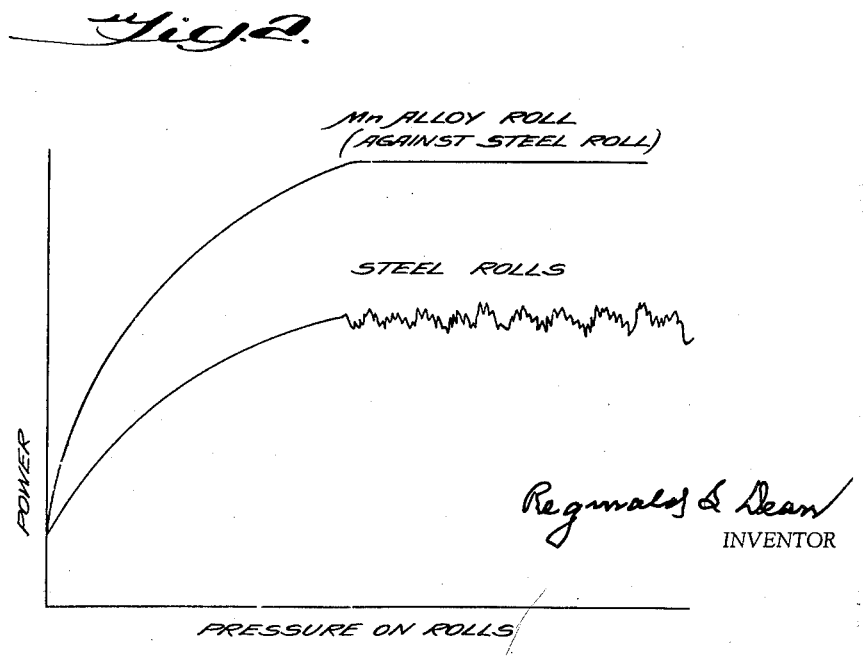

Figure 2 graphically illustrates a comparison between a steel roll and a manganese alloy roll.

In Figure 1 I have illustrated a simple friction drive consisting of a polished steel roll 1 running against a polished roll of 80% manganese, 20% copper 2 having the properties shown in Table 1.

TABLE 1

A. C. D. C. manganese alloy No. 780

Nominal composition _____ Mn 80%, Cu 20%
Composition range _____ Mn 78–82%, Cu balance B. Mechanical properties quenched from 850° C.

| | |
|---|---|
| Tensile strength, p. s. i. | 68,000 |
| Yield strength, p. s. i. | 24,000 |
| Proportional limit | 13,000 |
| Elongation in 2", percent | 35 |
| Reduction of area, percent | 49 |
| Rockwell hardness | B–55 |
| Endurance limit $1 \times 10^8$ cycles, p. s. i. | 17,000 |
| Tensile modulus, p. s. i. | 13,500,000 |
| Shear modulus | 4,000,000 |
| Poissons ratio | 0.7 |
| Damping capacity low stress T | 7.0 |
| Small increment on— | |
| 5,000 p. s. i., percent | 20.0 |
| 10,000 p. s. i., percent | 80.0 |
| Internal friction Q (for comparison, Q for beryllium copper=5) | 1,750 |

C. Mechanical properties hot rolled

| | |
|---|---|
| Damping capacity low stress, percent | 17.0 |
| Safe load factor K, lbs./sq. in. of face on cam follower (for comparison, cast iron K=750) | 3,000 |

D. Mechanical properties cold rolled

| | |
|---|---|
| Tensile strength, p. s. i.: | |
| 10% reduction | 90,000 |
| 30% reduction | 130,000 |
| Yield strength p. s. i.: | |
| 10% reduction | 89,000 |
| 30% reduction | 115,000 |
| Elongation, percent in 2": | |
| 10% reduction | 10 |
| 30% reduction | 9 |

The rolls are lubricated with a light oil. When a low pressure is applied through the lever 3 and the steel roll is driven by motor there is substantially no transmission of power registered by dynamometer 4 linked to roll 2 by Prony brake 5. As the pressure holding the two rolls together is increased the shear strength of the oil film is increased and power is transmitted but inefficiently.

Up to this point there is no difference in behavior of the manganese alloy and a similar roll of steel. Further pressure, however, produces surface conformance between the rolls. The low shear modulus of the manganese alloy produces a much greater surface conformance at a given pressure. The oil film is therefore not broken by the extremely high pressure of point contact which would be found with two steel rolls. Power may therefore be transmitted without seizing and wear. Further the loss in power due to deformation of the roll is less because the pressure to produce the deformation is less.

The comparison between a steel roll and the manganese alloy roll is illustrated in Figure 2. Pressure on rolls within the range of the figure is from 0–100 lbs. per linear inch with a manganese alloy roll 6 inches diameter. Larger rolls take less pressure to produce the same result. The power transmitted within the range of the diagram is from 0–1 horsepower per linear inch for a 6 inch roll.

I claim:

A lubricated friction drive consisting of two members in surface contact so that movement of one member actuates motion in the other member due to friction between the members; at least one member being an alloy containing 70–90% manganese, balance substantially copper, said member being held in contact with the other member by pressure whereby to provide substantial surface conformance but not break the lubricating film during actuation of the drive.

No references cited.